United States Patent [19]
Kennedy

[11] Patent Number: 5,301,281
[45] Date of Patent: Apr. 5, 1994

[54] METHOD AND APPARATUS FOR EXPANDING A BACKPLANE INTERCONNECTING BUS IN A MULTIPROCESSOR COMPUTER SYSTEM WITHOUT ADDITIONAL BYTE SELECT SIGNALS

[75] Inventor: Barry Kennedy, Santa Ana, Calif.

[73] Assignee: AST Research, Inc., Irvine, Calif.

[21] Appl. No.: 721,684

[22] Filed: Jun. 26, 1991

[51] Int. Cl.⁵ .................. G06F 13/40; G06F 13/14
[52] U.S. Cl. ................................. 395/325; 364/230; 364/230.4; 364/240; 364/240.3; 364/240.9; 364/DIG. 1
[58] Field of Search .......... 395/235, 200, 725, 800, 395/275, 425; 370/85.1, 85.9, 85.13; 340/825, 825.06; 364/132; 365/230.01

[56] References Cited

U.S. PATENT DOCUMENTS

| | | | |
|---|---|---|---|
| 4,286,319 | 8/1981 | Membrino et al. | 364/200 |
| 4,412,286 | 10/1983 | O'Dowd | 364/200 |
| 4,417,303 | 11/1983 | Korowitz | 364/200 |
| 4,654,784 | 3/1987 | Campanini | 364/200 |
| 4,683,534 | 7/1987 | Tietjen et al. | 364/200 |
| 4,720,784 | 1/1988 | Radhakrishnan et al. | 364/200 |
| 4,799,187 | 1/1989 | Einarson et al. | 364/900 |
| 4,967,344 | 10/1990 | Scavezze | 364/200 |
| 4,974,143 | 11/1990 | Yamada | 364/200 |
| 4,984,195 | 1/1991 | Nakamura et al. | 364/200 |
| 5,014,187 | 5/1991 | Debize et al. | 364/200 |
| 5,034,879 | 7/1991 | Woodward et al. | 364/200 |
| 5,055,661 | 10/1991 | Gochi | 235/492 |
| 5,109,490 | 4/1992 | Arimilli et al. | 395/325 |
| 5,113,369 | 5/1992 | Kinoshita | 395/325 |
| 5,148,539 | 9/1992 | Enomoto et al. | 395/425 |

OTHER PUBLICATIONS

Bursky, Dave, "More, Not Fewer, Chips Give PC's Flexible Options," *Electronic Design*, vol. 38, No. 10, pp. 95-98, May 24, 1990.

Thorson, Mark, "S3 Introduces Flexible PC Chip Set Family," *Microprocessor Report*, vol. 4, No. 9, pp. 1-2, 9-11, May 18, 1990.

Thorson, Mark, "AGI Bus Supports 486 Multiprocessing," *Microprocessor Report*, vol. 4, No. 11, pp. 9-11, Jun. 20, 1990.

S3, Advanced Cache Controller Preliminary Information Sheet (Apr. 1990).

*Primary Examiner*—Gopal C. Ray
*Attorney, Agent, or Firm*—Knobbe, Martens, Olson & Bear

[57] ABSTRACT

A method and apparatus for expanding a backplane interconnecting bus provides an architecture in which the width of a data bus can be expanded without new byte select control lines on the backplane bus. In the present invention, data lines and corresponding parity lines are added to the backplane bus, and control signal lines connect devices capable of utilizing the expanded bus capabilities. The control signal lines do not affect the operation of devices which are designed according to the narrower bus width, and therefore, these devices can be installed in the expanded bus backplane along with devices designed to utilize the expanded width data bus.

10 Claims, 7 Drawing Sheets

METHOD AND APPARATUS FOR EXPANDING A BACKPLANE INTERCONNECTING BUS IN A MULTIPROCESSOR COMPUTER SYSTEM WITHOUT ADDITIONAL BYTE SELECT SIGNALS

BACKGROUND OF THE INVENTION

1. Field of the Invention

The present invention relates to a backplane bus for interconnecting one or more microprocessors, memory modules, and input/output (I/O) peripheral boards. Specifically, the invention relates to a method and apparatus to expand the width of the data bus portion of the backplane bus without the use of additional byte select lines. According to the present invention, devices designed for previous unexpanded systems are still suitable for use in the expanded system.

2. Description of the Related Art

The processing requirements of computer systems for personal and business needs continuously become more demanding. For instance, more complex application programs for use with local area networks are continuously being developed. Moreover, many multi-user systems provide access to more than one operating environment, such as UNIX and DOS, on the same system.

In general, the computers servicing these needs are single processor systems conforming to conventional architectures using a standard input/output I/O bus such as the Extended Industry Standard Architecture (EISA). New and more powerful systems constantly emerge. However, upgrading an old system generally requires investing in substantial hardware modifications or buying a new system.

One solution to the constantly changing power of microprocessors controlling a system is the CUPID architecture designed by AST Research Inc. In the CUPID architecture, the microprocessor based central processing unit (CPU) and the memory unit are not permanently attached to the backplane bus, but are removable circuit boards running at their own speed, asynchronous with the backplane bus operations. Thus, when more power from the microprocessor is desired, a faster CPU can replace the existing CPU.

However, as processing power demands increase, application software and operating systems would benefit from an architecture similar to the CUPID architecture, but which has multiprocessor capabilities to provide parallel processing and high interactivity and batch performance.

Some multiprocessor bus configurations have been proposed such as the Micro-Channel architecture by IBM. However, expanding the width of the interconnecting bus, once the bus size is initially selected, generally requires adding additional byte select lines on the bus to control I/O operations. This results in modifications to the interconnecting bus. The modifications to the backplane are not difficult. However, if the bus has new control lines, the circuit boards designed for the narrower bus may not function properly on the wider bus. Accordingly, to use an expanded bus often requires redesigning of the circuit boards used in connection with the bus. This again leads to substantial expense for one who wishes to upgrade a system.

SUMMARY OF THE INVENTION

It would be advantageous to provide an interconnection architecture that is capable of supporting multiple processors to provide high performance batch processing and/or high availability, multi-user services. Moreover, it would be advantageous if such a multiprocessor computer system provided expandability capabilities for adding more memory, more I/O controllers, additional CPUs, and even widening the system data bus without the use of additional byte select lines on the interconnection bus. Desirably, the circuit boards designed for the narrower bus could be used on the wider bus without modification to the circuit board designs.

The present invention involves a method and apparatus for expanding the width of a multiprocessor interconnection system without the addition of byte select control signals on the common backplane bus. The only additional lines used are data and parity lines.

One aspect of the present invention involves an expanded multiprocessor interconnection architecture having a common backplane bus for use in connecting master and slave devices together, wherein the common backplane bus has an expanded data bus bit-width from a first architecture, and wherein no additional byte select control lines are used for the expanded architecture beyond those used for the first architecture. In one preferred embodiment, the architecture comprises in summary, a master request line which is activated by a master device designed to utilize the expanded bit-width of the expanded architecture, and a slave acknowledge response line which is activated by a slave device designed to utilize the expanded bit-width of the expanded architecture in response to an active signal on the master request line.

In one embodiment, the expanded multiprocessor interconnection architecture further comprises a slave device designed for use with the expanded architecture, a master device designed for use with the first architecture, and a slave device designed for use with the first architecture.

Another aspect of the present invention involves a method of expanding the data bus width of a first multiprocessor interconnection architecture having a first bit-width and a backplane bus with byte select lines sufficient to indicate which of the bytes on the data bus are active during a bus transaction cycle to create a second expanded multiprocessor interconnection architecture with an expanded bit-width and without additional byte select control lines. According to this method, data lines are added to the first multiprocessor interconnection architecture, and parity lines are added to provide parity checking for the added data lines. A master request interconnection line is also provided which carries a signal activated by a master device designed to utilize the bit-width of the second expanded multiprocessor interconnection architecture. Finally, a slave response interconnection line is provided which carries a signal activated by a slave device designed to utilize the bit-width of the expanded backplane architecture in response to an active signal on said master request line.

DETAILED DESCRIPTION OF THE PREFERRED EMBODIMENT

Figure 1:
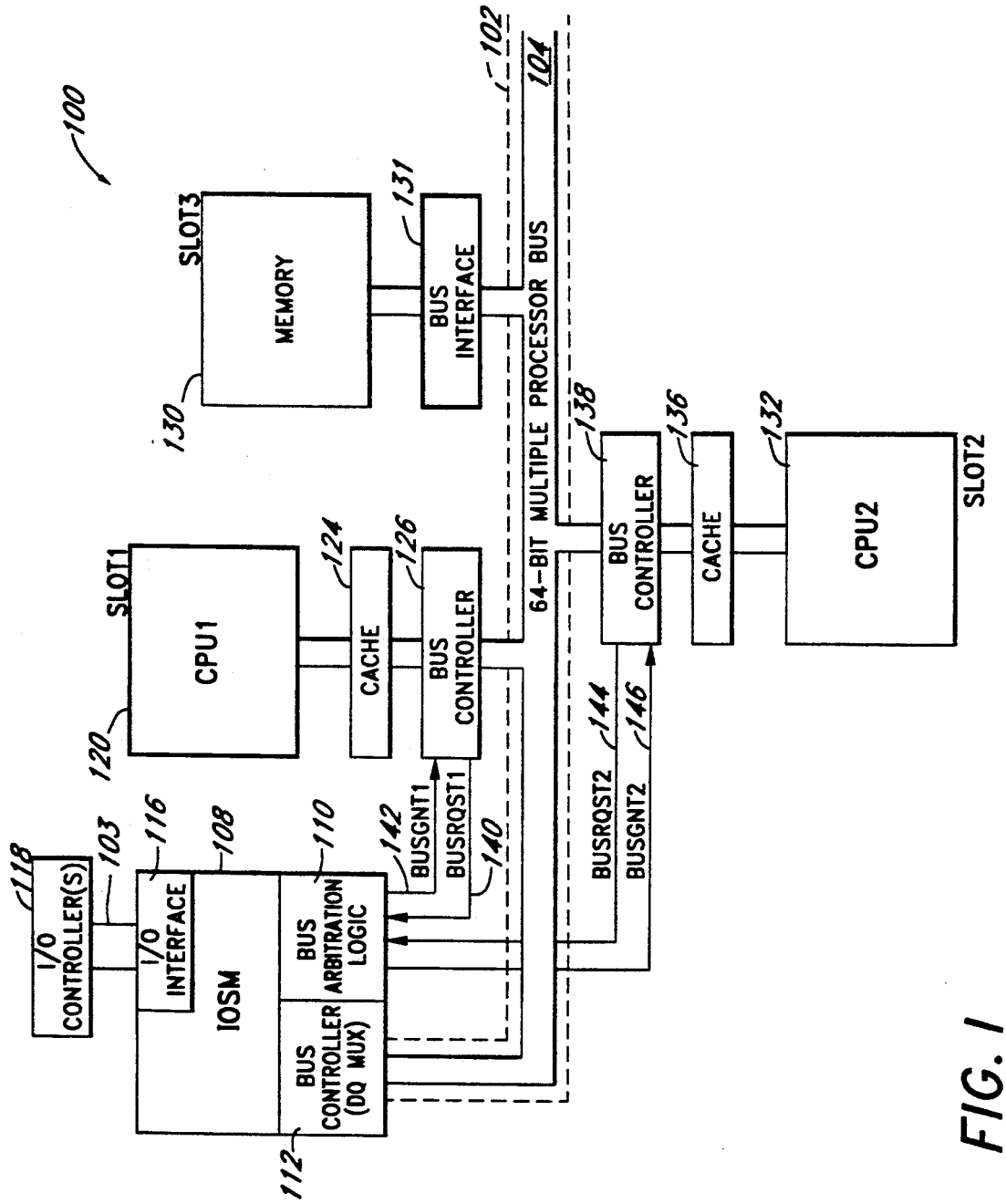
FIG. 1 is a block diagram of a multiprocessor interconnection architecture with a 64-bit data bus.

FIG. 1 is a block diagram of an exemplary multiprocessor interconnection system 100. The system 100 of the present embodiment comprises, in general, a backplane system bus 102 with a 64-bit, multiple-processor bus 104, an input/output (I/O) bus 103, which advantageously comprises an Extended Industry Standard Architecture (EISA) bus in the present embodiment, an input/output services module (IOSM) 108 with a corresponding bus controller 112, I/O controllers 118 which use the I/O bus 103, a first central processing unit (CPU1) 120 with a corresponding cache 124 and bus controller 126, a memory module 130 with a corresponding bus interface 131, and a second central processing unit (CPU2) 132 with a corresponding cache 136 and bus controller 138. Preferably, the I/O controllers 118 comprise conventional EISA compatible controllers in the present embodiment. Advantageously, the I/O bus 103 has 8 I/O connectors (e.g. conventional EISA I/O connectors) for the I/O controllers 118, and the backplane system bus 102 for the 64-bit system has eight system connectors along the 64-bit bus 104. An additional connector designated to contain the IOSM 108 is located between the system bus 102 and the I/O bus 103. The IOSM 108 interfaces the system bus 102 for the 64-bit system with the I/O bus 103.

Advantageously, the bus connectors for the 64-bit system are 240 pin METRAL connectors from DuPont, and the bus connector for the IOSM 108 is a 480 pin METRAL connector. The I/O bus connectors in the present embodiment are standard connectors from Burndy Corp. well understood in the art.

The system bus 102 also comprises a number of conventional control signal lines, of which a few are relevant for discussion of the present invention. These are a cycle terminate (CTERM-) signal line (not shown) which indicates that data is valid on the system bus 103, a system end of transaction (SEOT-) signal line (not shown) which carries a signal to master devices and the bus arbitration logic 110 that the bus transaction is complete, a snoop dirty (SNPDRTY-) signal line (not shown) which carries a signal to indicate that a cache is intervening in a transaction to write-back data to memory, a pair of transaction length (TLEN[0:1]-) signal lines (not shown) which indicate the number of bus cycles in a bus transaction, and a write-back start (WBSTRT-) signal line (not shown) which indicates that valid address and command signals are on the bus 102 for a write-back cycle from a cache.

The IOSM

Figure 2:
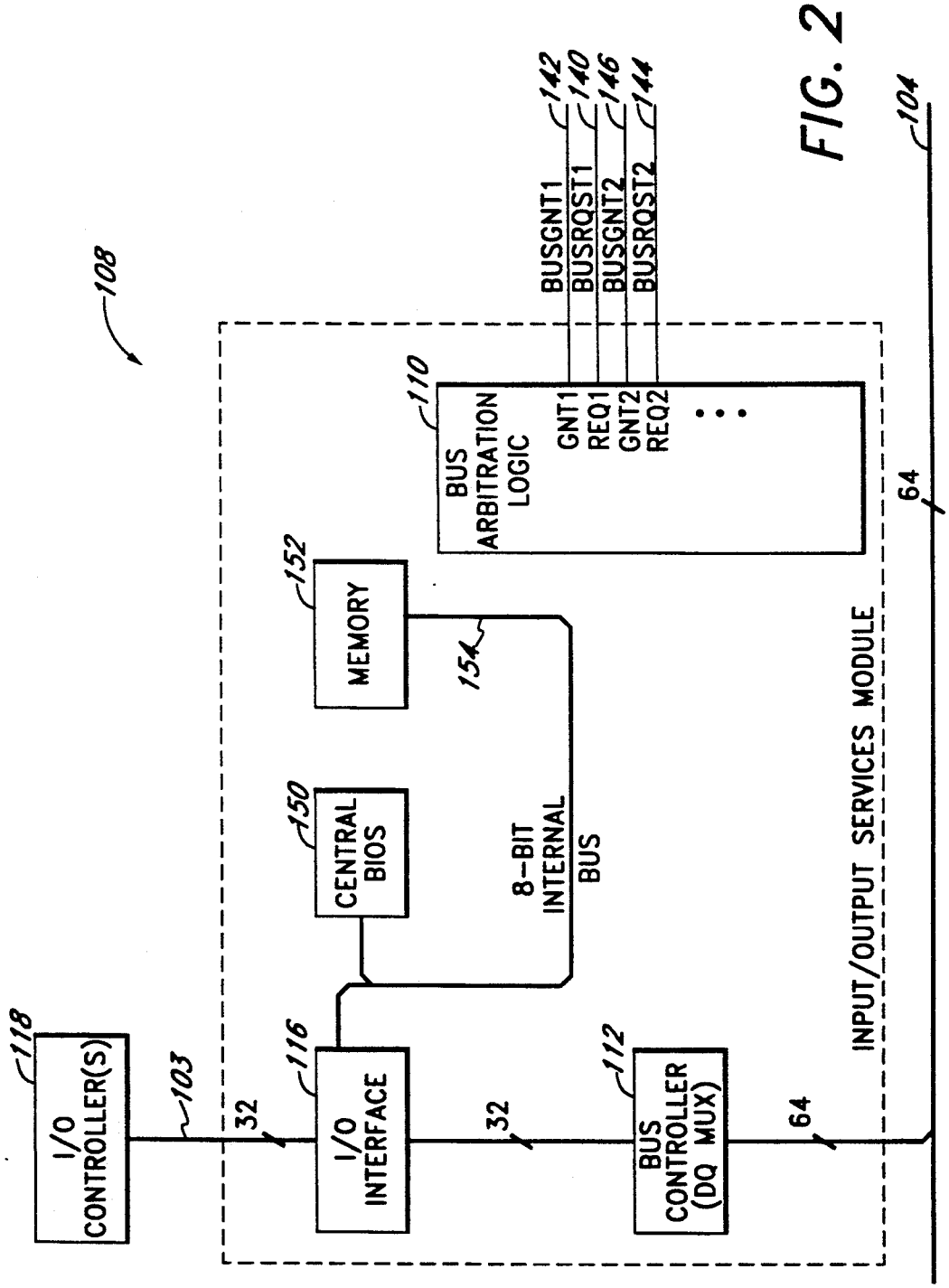
FIG. 2 is a block diagram of the input/output (I/O) services module of the interconnection architecture of FIG. 1.

The IOSM 108, as shown in more detail in FIG. 2, comprises bus arbitration logic 110, the bus controller 112 which interfaces with the 64-bit multiprocessor bus 104, an I/O interface 116, which interfaces with the I/O bus 103, a central basic input/output system (BIOS) read-only-memory (ROM) 150, a memory 152, and an internal 8-bit data bus 154 which interconnects the central BIOS 150, the memory 152 and the I/O interface 116. Preferably, the internal 8-bit bus 154 also connects to a real time clock (not shown), a parallel port (not shown) a serial port (not shown), a floppy disk controller (not shown), a keyboard controller (not shown), and a system timer/counter (not shown), all well understood in the art.

The I/O interface 116 advantageously comprises a conventional EISA bus controller chip set as well known in the art, and interfaces the conventional 32-bit I/O controllers 118 and the internal 8-bit bus 154 with the multiple processor system bus 102 via the bus controller 112. The bus controller 112 interfaces with the system bus 102 using a 32-bit to 64-bit multiplexer/demultiplexer (a double word/quad word multiplexer ('DQ MUX')). The DQ-MUX of the bus controller 112 breaks up 64-bit words into two 32-bit words, or combines 32-bit words into 64-bit words as well known in the art. Advantageously, the bus controller 112 also includes a single level storage buffer (not shown).

In the present embodiment, the central BIOS ROM 150 comprises a read-only-memory with the BIOS instruction set for an INTEL 80486 microprocessor. Accordingly, in the present embodiment, at least one CPU connected to the 64-bit bus is, or emulates, an INTEL 80486 microprocessor. Advantageously, the memory 152 comprises 8 Kbytes of complementary metal oxide semi-conductor (CMOS), static random access memory (SRAM).

The bus arbitration logic 110 accepts a number of individual bus requests from various devices which can become bus masters and provides a signal to grant the bus to the device requesting the bus as well understood in the art. The bus arbitration logic 110 operates on a conventional scheme consisting of two signals carried by a bus request (BUSRQSTn) signal line and a bus grant (BUSGNTn) signal line, one of each for every device which can become a bus master. The bus arbitration logic 110 communicates with bus controllers for these operations. For example, the bus controller 126 for the CPU1 120 (FIG. 1) requests the bus by activating a BUSRQST1 signal line 140, and the bus arbitration logic 110 responds with an active signal on a BUSGNT1 signal line 142 to grant the bus to the CPU1 120. Similarly, the bus controller 138 for the CPU2 132 requests the bus by activating the BUSRQST2 signal line 144, and the bus arbitration logic 110 grants the bus to the CPU2 132 by activating the BUSGNT2 signal line 146. The I/O interface 116 may also obtain control of the bus, on behalf of an I/O controller 118 requesting to be a bus master, with corresponding BUSRQST0 and BUSGNT0 signal lines (not shown).

Devices installed on the system bus 102 advantageously accept a 64-bit transfer even though the actual device may not utilize a full 64-bit data bus. For instance, if the CPU1 120 is based upon an INTEL 80486 which uses a 32-bit data bus, the bus controller 126 accepts a 64-bit transfer from the system bus 102, places this data into the cache 124 which provides a 32-bit interface to the CPU1 120.

The CPU Modules

The CPU1 module 120 could be any microprocessor chip set running at any speed. In the present embodiment, at least one CPU is based upon an INTEL 80486 or compatible microprocessor. Accordingly, throughout the remainder of this description, references to the CPU1 120 assume an INTEL 80486-based CPU with supporting resources and on-board crystal oscillators for independent timing. Other CPUs in the system need not be 80486-based as explained in more detail herein.

CPUs installed in the bus 104 may have independent asynchronous timing with respect to the bus 104.

In the present embodiment, the cache 124 for the CPU1 120 is a 256-Kbyte, two-way, set-associative, write-back cache with a 32-byte line size (4 bus cycles×8 bytes). The cache 124 interfaces the asynchronous CPU1 120 with the synchronous 64-bit bus 104 via the bus controller 126 which responds to signals on the BUSRQST1 signal line 140 and the BUSGNT1 signal line 142 as explained. The cache 124 supports write-back and the conventional Modified, Exclusive, Shared, Invalid (MESI) protocol to maintain cache coherency for the multiprocessor system 100. The cache 124 has a corresponding 64-bit interface (not shown) for the 64-bit bus 104 and a 32-bit interface (not shown) with the 80486 processor. When the cache 124, or any other cache, generates a write-back cycle, it asserts an active low signal on the write-back start (WBSTRT-) control line (not shown) to indicate the beginning of a write-back cycle from the cache as well understood in the art.

The CPU2 132 is similar to the CPU1 120 except that the CPU2 132 need not be an 80486 based CPU. The CPU2 132 also has a corresponding bus controller 138 and a cache 136 similar to those associated with CPU1 120. Further CPUs may also be added to the system and need not comprise INTEL 80486 based CPUs.

The Memory Modules

In the present embodiment, the memory module 130 accepts 64-bit transfers. However, memory modules need not be capable of accepting full 64-bit transfers. Advantageously, the memory 130 comprises 40-bit single-in-line memory modules (SIMMs) which could be constructed from 1-Meg-by-4 or 4-Meg-by-4 dynamic random access memories (DRAMs). Toshiba's THM401020SG-80 is an exemplary 10-chip SIMM appropriate for use in the present system. The memory 130 supports 64 megabytes (per module) of RAM with 1-Meg-by-4 DRAM based SIMMs, or 256 megabytes (per module) with 4-Meg-by-4 DRAM based SIMMs. The present embodiment allows up to four memory modules to be installed in the system. The memory module 130 also includes error correction code (ECC) capability for reliability. However, to eliminate the read-modify-write cycle caused by 32-bit operations on a 64-bit ECC memory, ECC is performed on a 32-bit basis and not on a 64-bit basis.

The memory module 130 also comprises a DRAM controller (not shown) which provides conventional row address select (RAS), column address select (CAS), hidden refresh, address multiplexing, page mode and burst mode support. Accordingly, the DRAM controller comprises DRAM RAS/CAS address multiplexers, RAS/CAS generation logic, refresh counters, page-mode/page-hit logic and DRAM address drivers, all well understood in the art. The DRAM controller derives memory timing from an external clock signal carried on the backplane bus 102, and therefore, runs synchronously with the bus 102.

In the present embodiment, the memory 130 also includes a corresponding bus interface 131 to the 64-bit bus 104. Advantageously, the bus interface 131 comprises a 16-level by 36-bit wide register. Parity generation and checking for the bus interface 131 is performed on a byte-by-byte basis for data entering and leaving the bus interface 131.

128-Bit Bus Expandability

Figure 3:
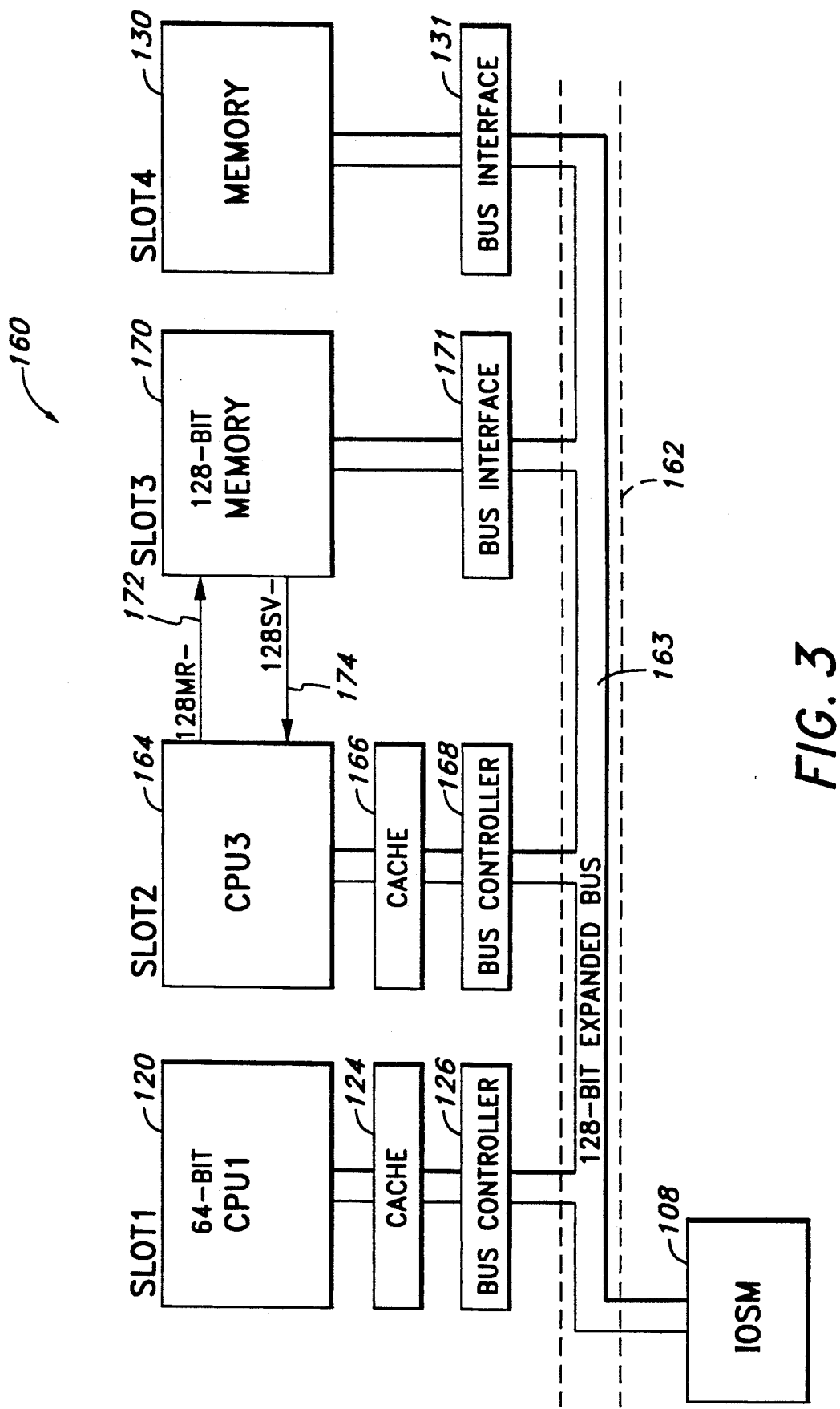
FIG. 3 is a block diagram of a multiprocessor interconnection architecture with an expanded 128-bit data bus, and illustrates the control connections for expanding the multiprocessor interconnection architecture.

FIG. 3 is a block diagram of a multiprocessor interconnection architecture system 160 similar to that shown in FIG. 1. However, the system has an expanded backplane system bus 162 with data bus 163. Preferably, the data bus 163 is expanded from the bus 104 to 128 data bits, and the backplane bus 162 has eight additional parity lines. Otherwise, the backplane system bus 162 is similar to the backplane system bus 102 (FIG. 1). This system 160 additionally comprises a 128-bit master device depicted as a CPU 164 with a corresponding 128-bit wide cache 166 and a bus controller 168. The system 160 further allows 128-bit slave devices. One 128-bit slave device is shown in FIG. 3 as a second memory module 170 with a corresponding bus interface 171. The CPU3 164 is a 128-bit master device capable of transferring up to 128 data bits of information in one transaction or capable of using its cache to perform 128-bit wide transactions on the system bus 102. The second memory 170 is a 128-bit slave device capable of receiving up to 128 data bits of information in a single transfer. The CPU1 120 and the memory 130 and any other 64-bit devices designed for the system 100 may remain unchanged.

As briefly explained above, expansion to 128 bits of data would normally involve additional byte select lines that indicate which bytes are valid during a transfer on the bus as well understood in the art. Conventionally, the CPU1 120 asserts the proper byte select lines connected to the cache 124. The cache 124 generates the appropriate signals for the byte select lines for the bus controller 126 and the system bus 102. For instance, the backplane bus 102 advantageously comprises eight byte select lines (BSE[0 . . . 7]) (not shown) which are activated by the cache 124, and depending on the type of cache cycle, by decoding conventional address line A2, as is well understood in the art. The addresses for memory or I/O locations are then asserted on the balance of the address lines during a transfer. An expanded bus, following this convention, would use eight additional byte select lines to indicate which of the bytes on the bus are valid during a bus transaction. These could be added to the bus 162 and controlled by decoding the address lines A2-A3. The memory and I/O addresses would then be asserted on the balance of the address lines above A4. However, according to the present invention, the 128-bit devices can be installed along with 64-bit devices in the modified bus 163 and function properly and efficiently without any additional byte select lines.

The control is accomplished with a pair of control lines connected to each 128-bit device on the bus 163. According to the present invention, the control lines comprise a 128_bit_master (128MR-) control line 172 and a 128_bit_slave (128SV-) response line 174 (FIG. 3). The other additional signal lines for the bus 162 comprise conventional parity lines and 64 additional data lines for the data bus 163. In the present embodiment, eight additional parity lines are added, one parity line for every eight data lines added. The 128-bit master devices continue to drive address line A3 for addressing of the upper 64 bits instead of only driving address lines A4 and above if additional byte select lines were added. This provides direct addressing control to select either the upper 64 bits (A3=1) or the lower 64 bits (A3=0).

Advantageously, the system design of the present embodiment adheres to a number of assumptions: the line size of all caches in the system is the same—32 bytes in the present embodiment; the memory is aligned on 128-bit boundaries; the proper level of address line A3 is asserted on the bus even by 128-bit masters; the byte select lines indicate which data bytes are valid in the transfer; and the byte select lines are always contiguous.

If a 128-bit master performs a write with less than a full 128 bits of data, it emulates a 64-bit master. Full 128-bit transfers by a 128-bit master become more complex.

128-Bit Write Transactions

Figure 4:
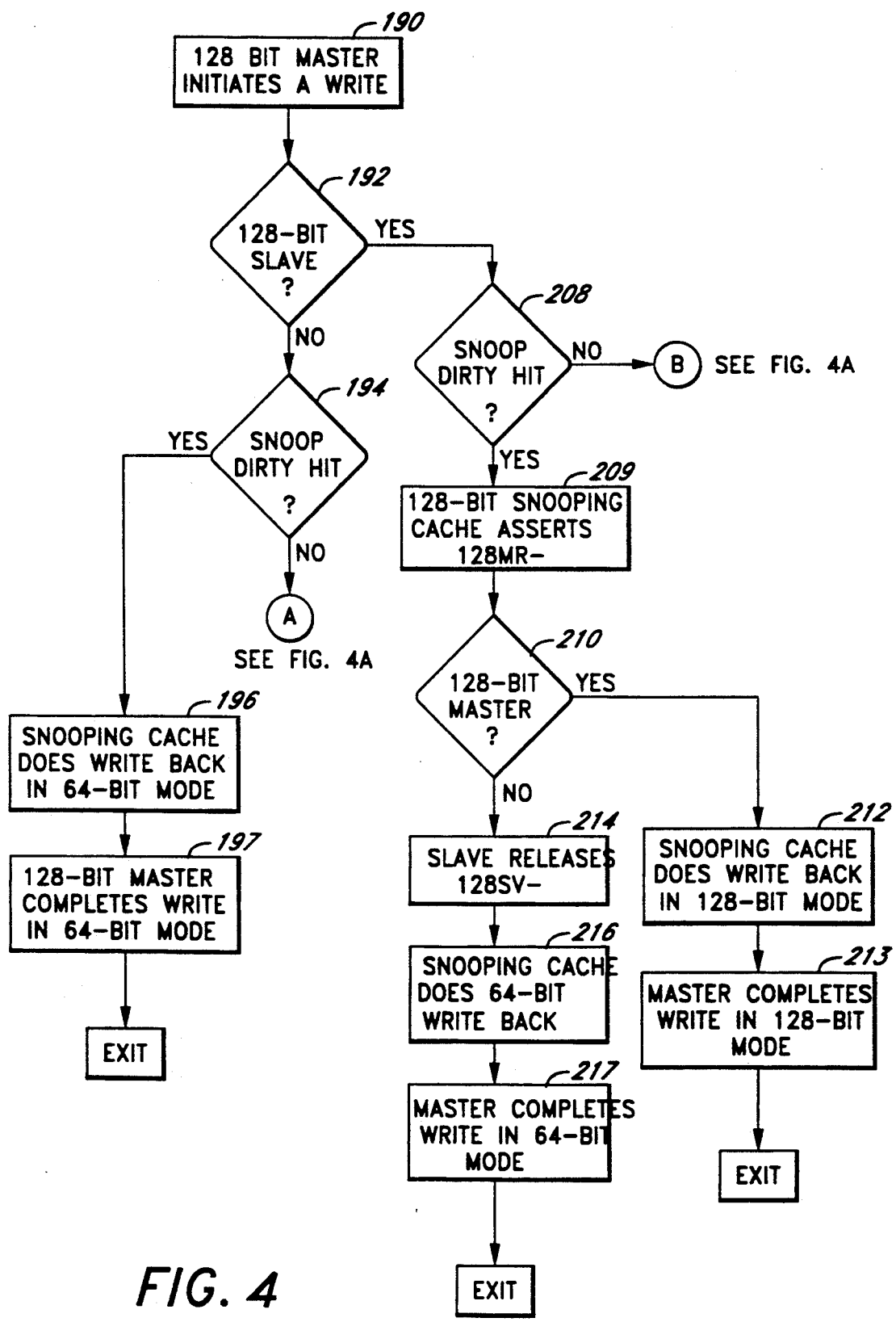
FIGS. 4 and 4A illustrate a flow chart of an exemplary write transaction initiated by a 128-bit master device.
Figure 4A:
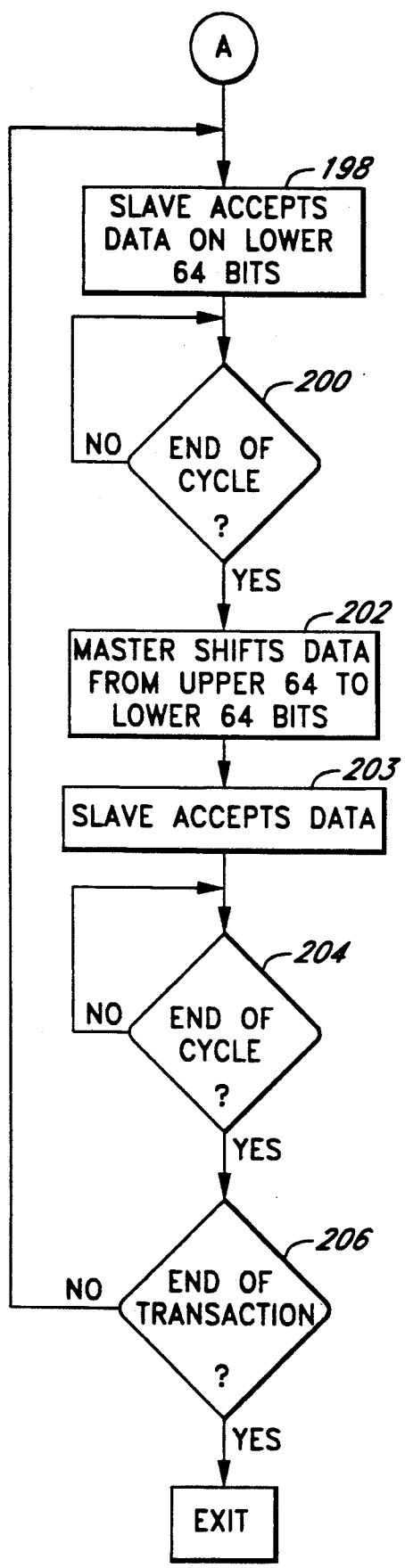
Figure 4A:
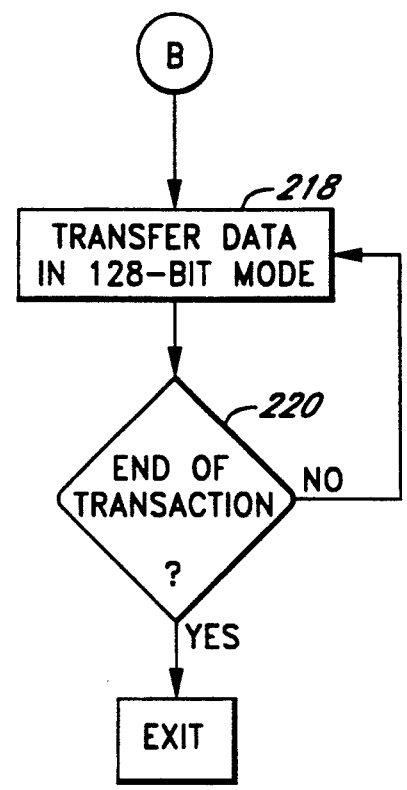

FIGS. 4 and 4A illustrate the flow chart for a bus write transaction initiated by a 128-bit master. This transfer is described with reference to bus controller 168 transferring 128 bits of data to a 64-bit slave (e.g. the memory 130) or a 128-bit slave (e.g. the memory 170). As briefly explained previously, the bus 162 has two signal lines TLEN[0:1] (not shown) which carry signals indicating the length of a bus transaction in cycles. Preferably, a transaction can be either 1, 2, 4, or 8 bus cycles long.

Write to 64-Bit Slaves

The bus controller 168 initiates the 128-bit transfer, as represented in an action block 190, by activating the address on the bus 162, activating the 128MR- signal line 172 to indicate that a 128-bit master is attempting to initiate a 128-bit transaction, and selecting appropriate signal levels on the TLEN[0 ... 1] signal lines indicating the length of the bus transaction as if the transfer was from a 64-bit master (e.g. if the transaction involves a single transfer of 128 bits of data, the bus controller 168 selects a transaction length of 2 to indicate 2 cycles of 64 bits each). The bus controller 168 then observes the level of the 128SV- signal line 174 to determine if the slave is also a 128-bit device, as represented in a decision block 192. If the transfer is to the memory 130, then, because 64-bit devices need not be designed to handle 128-bit transfers, the memory 130 does not recognize the active signal on the 128MR- signal line 172. Therefore, the 64-bit slave does not respond on the 128SV- response line 174. The bus controller 168, receiving no response on the 128SV- response line 174, assumes that the device addressed is a 64-bit slave and proceeds to a decision block 194.

Next, the bus controller 168 checks the level of the SNPDRTY- signal line, as represented in the decision block 194, to determine if another cache has indicated a snoop dirty hit invoked by an access to the memory location addressed by the bus controller 168 in the transfer. If a snoop dirty hit occurred with another cache, then the snooping cache executes a write-back in 64-bit mode to the memory location addressed by the bus controller 168 and marks the corresponding line in the cache as invalid, as represented in an action block 196. The bus controller 168 then completes the write transaction to the memory location with its data, as represented in an action block 197.

Even if the snooping cache is a 128-bit master, the 128SV- signal line 174 is inactive because the slave is a 64-bit device as explained above. Thus, if the snooping cache is a 128-bit master, it emulates a 64-bit device to execute the write-back.

The write-back proceeds even for 128-bit transfers because the line size of the caches in the present embodiment (256 bits) exceeds the width of a 128-bit transfer, and the caches do not maintain the status of which bytes in any 32-byte line have been modified. The caches indicate a snoop dirty hit if any portion of the line has been modified and any portion of the line contains data corresponding to the address selected for the write transaction. This is the case even if only a portion of data in the cache has been modified and even if the portion modified corresponds to the identical memory location addressed in the write transaction. Accordingly, a cache with a snoop dirty hit transfers the entire 32-bytes of data during a write-back transaction, and the precise memory location corresponding to the modified data in the cache may or may not be identical to the precise memory location in the write initiated by the 128-bit master.

If no snoop dirty hit occurred on the transaction (decision block 194), then the Write transaction proceeds as depicted starting at 'A' in the flow chart of FIG. 4A. The 64-bit slave accepts the data on the lower 64-bits of the bus 163, represented in an action block 198. The bus controller 168 then waits for the bus cycle to end, indicated by an active pulse on the CTERM- signal line (not shown), as represented in a decision block 200. Then, the bus controller 168 internally shifts the upper 64 bits of data to the lower 64 bits and enables this data onto the bus 163, as represented in an action block 202 and the slave accepts this data, as represented in an action block 203. The slave expects the subsequent transfer and automatically internally increments the memory address because the transaction length on the TLEN[0:1] signal lines was selected for 64-bit bus cycles. The bus controller 168 then waits for the bus cycle to end, as represented in a decision block 204. Finally, the bus controller 168 checks the SEOT- signal line to determine if the bus transaction is completed (i.e. the requested number of bus cycles have been completed), as represented in a decision block 206. If the transaction is not complete, then the bus controller 168 initiates further transfers as previously described with reference to blocks 198–206.

Write to 128-Bit Slaves

If after initiating the write operation (action block 190), the bus controller 168 detects an active signal on the 128SV- signal line 174 (decision block 192), the bus controller 168 checks the level of the SNPDRTY- signal line to determine if a snoop dirty hit has occurred in another cache, as represented in a decision block 208. If a snoop dirty hit has occurred, the snooping cache asserts the 128MR- signal line 172, as represented in an action block 209. The bus controller 168 then checks the level of the signal on the 128MR- signal line 172 to determine if the snooping cache is a 128-bit master or a 64-bit master, as represented in a decision block 210. If the 128MR- signal line 172 is active, then the snooping cache, also detecting the active signal on the 128SV- signal line 174, executes a write-back to the 128 bit slave in 128-bit mode (i.e. transfers 128-bits of data per bus cycle), as represented in an action block 212. Subsequently, the bus controller 168 completes the initial write operation in 128-bit mode, as represented in an action block 213. If the 128MR- signal line 172 is not active (decision block 210), indicating a 64-bit snooping cache, the 128-bit slave device releases the 128SV- signal line 174, as represented in an action block 214, and the snooping cache executes the write-back operation using 64-bit bus cycles, as represented in an action block 216. The 128-bit slave releases the 128SV- signal line because the snooping cache is a 64-bit master and the 128MR- signal line is, therefore, no longer active. The bus controller 168 then completes the initial write transaction in 64-bit mode, as represented in an action block 217, because the snooping cache caused the transaction to proceed on a 64-bit basis. The bus controller 168 detected this when it observed the level of the 128MR- signal line in decision block 210. This completes the transaction for a 128-bit slave with a snoop dirty hit on another cache.

Finally, if the bus controller 168 senses an active signal on the 128SV- signal line 174 to determine that the slave is a 128-bit device, as represented in the decision block 192, and no snoop dirty hit occurs in another cache (decision block 208), the write transaction proceeds as illustrated in the flow chart of FIG. 4A beginning at the entry point 'B'. Accordingly, the bus controller 168 transfers the data using 128-bit bus cycles, as represented in an action bock 218. The bus controller 168 transfers data until it detects an active signal on the SEOT- signal line to indicate that the designated number of bus cycles have been completed as selected by the signals on the TLEN[0:1] signal lines, represented in a decision block 220. However, as explained above, the bus controller 168 selected a transaction length based on 64-bit bus transfers. Accordingly, the 128-bit slave devices in the system adjust the transaction length accordingly when the 128MR- signal line is high by dividing the transaction length by two.

Advantageously, 128-bit masters do not initiate burst mode write transactions (write transactions with blocks of data) for write operations that can obtain a snoop dirty hit by another cache. The masters perform a single write cycle so the data can be merged in memory with the data held in a snooping cache.

If a 128-bit master initiates a burst write with a transaction length equal to the size of a cache line, then any snooping cache with a snoop dirty hit marks the data as invalid and does not initiate a write-back operation.

128-Bit Read Transaction

Figure 5:
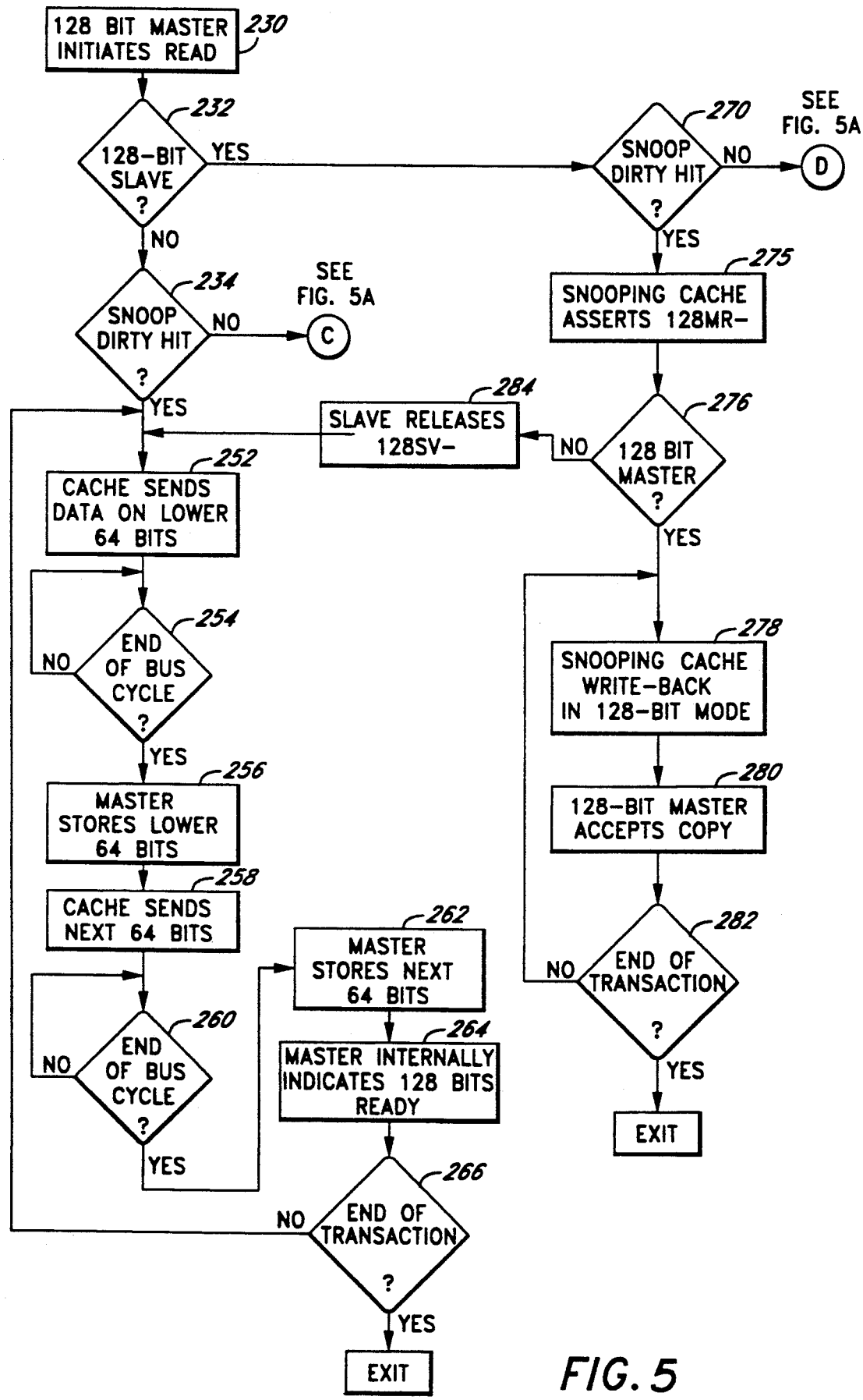
FIG. 5 and 5A illustrate a flow chart of an exemplary read transaction initiated by a 128-bit master device.
Figure 5A:
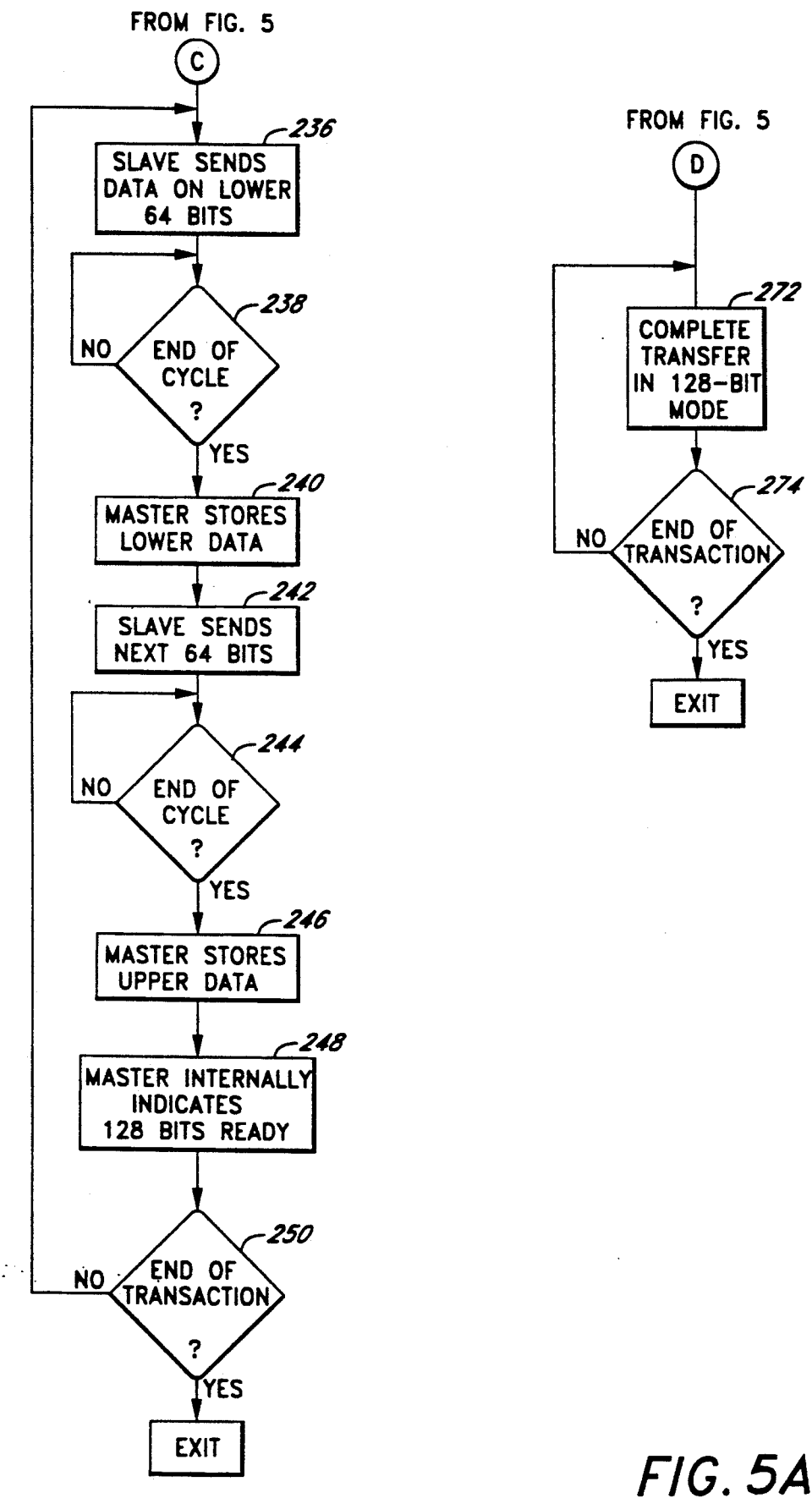

FIG. 5 and FIG. 5A illustrate the flow chart for a read transaction initiated by a 128-bit master (e.g. the bus controller 168).

Read From 64-Bit Slave Devices

When the bus controller 168 initiates a 128-bit read, as represented by an action block 230, it drives the 128MR- line 172 active, issues the address, and selects the appropriate transaction length as if it were a 64-bit master. The bus controller 168 then checks for a response on the 128SV- response line 174 to determine if the slave is a 128-bit device, as represented in a decision block 232.

If the 128SV- signal line 174 is not active, indicating a 64-bit slave device, the bus controller 168 checks the level of the SNPDRTY- signal line to determine if a snoop dirty hit has occurred in another cache, as represented in a decision block 234. If no snoop dirty hit has occurred, then the transaction proceeds as illustrated in FIG. 5A at entry point 'C.' The slave device enables the first 64 bits of data onto the data bus 163 (the lower 64 bits of the bus), as represented in an action block 236, and waits for the end of the bus cycle, as represented in a decision block 238. The bus controller 168 accepts the data while it is on the data bus 163, and stores the first 64 bits of data, as represented in an action block 240. The slave then sends the next 64-bits of data, as represented in an action block 242, and waits for the end of the bus cycle, as represented in a decision block 244. The bus controller 168 accepts the 64-bits of data while it is active on the data bus 163, and stores this data internally as the upper 64-bits of data, as represented by an action block 246. The bus controller 168 then indicates internally (locally) that all 128 bits of data are ready for processing, as represented in an action block 248, and checks to determine if further transfers in the transaction are pending, as represented in a decision block 250. If the transaction is not complete, the transfer sequence repeats from entry point C as explained. If the transaction is completed, signalled on the SEOT- signal line (i.e. the number of bus cycles corresponds to the number of 64-bit transfers as indicated on the TLEN[0:1] signal lines), the transaction is finished.

If a snoop dirty hit is detected (decision block 234, FIG. 5), the bus controller 168 allows the snooping cache to execute a write-back using 64-bit bus operations and the bus controller 168 accepts a copy of the data transferred in the write-back operation while the data is active on the bus 163. This proceeds as depicted in the flow chart of FIG. 5. The snooping cache, acting as a 64-bit master because the slave is a 64-bit device, enables the first 64 bits of data onto the lower 64 bits of the bus 163, as represented in an action block 252, and waits for the end of the bus cycle, as represented in a decision block 254. The bus controller 168 accepts a copy of the data while it is active on the bus, and then stores this data, as represented in an action block 256. The snooping cache sends the next 64-bits of data, as represented in an action block 258, and waits for the end of the bus cycle, as represented in a decision block 260. The bus controller 168 accepts a copy of the second 64 bits of data while it is active on the bus, and stores this data, as represented in an action block 262. The bus controller 168 then internally (locally) indicates that all 128 bits of data are ready for processing, as represented in an action block 264. If further transfers in the transaction are required, as represented in a decision block 266, the transfers proceed as explained for blocks 252-266. If no further transfers are necessary, the transaction is complete.

Read From 128-Bit Slaves

If upon initiating a 128-bit read operation (action block 230), the bus controller 168 detects an active signal on the 128SV- signal line 174 (decision block 232), then the bus controller 168 checks the SNPDRTY- signal line to determine if a snoop dirty hit has occurred, as represented in a decision block 270. If no snoop dirty hit has occurred, then the bus controller 168 completes the read as a full 128-bit bus transfer, as illustrated in the flow chart of FIG. 5A beginning at entry point D. Accordingly, the bus controller 168 transfers data using 128-bit bus cycles, as represented in action block 272, and completes any further transfers in the transaction, as represented in a decision block 274, to finish the bus transaction. As explained above for the write operation, the 128-bit slave adjusts the initial transaction length selected by the bus controller 168, by dividing it by two, because the transaction length was selected for 64-bit operations.

If a snoop dirty hit is detected (decision block 270, FIG. 5), then the snooping cache asserts the 128MR- signal line 172, as represented in an action block 275, the bus controller 168 now checks the 128MR- signal line 172 to determine if the snooping cache is a 128-bit device, as represented in an action block 276. If the snooping cache has activated the 128MR- signal line 172, the snooping cache also recognizes the active 128SV- signal line 174 and proceeds to execute a write-back operation as a full 128-bit transfer, as represented in an action block 278. During the write-back operation by the snooping cache, the bus controller 168 accepts a copy of the data being transferred to the 128-bit slave device while it is active on the bus 163, as represented in an action block 280. The bus controller 168 has determined how many bits of data to accept from each bus cycle in the write back transaction because it determined, as explained above, that the snoop dirty hit occurred in a 128-bit cache. If further transfers are required to complete the transaction, the transfer steps as described in reference to action blocks 278 and 280 are repeated. When no further transfers are required, as represented by a decision block 282, the transaction is completed.

If the snooping cache does not activate the 128MR- signal line (decision block 276), then the bus controller 168 determines that the snooping cache is only a 64-bit device, and the 128-bit slave device releases the 128SV- line because the 128MR- signal line is no longer active, as represented in an action block 284. The snooping cache then proceeds to execute a write-back operation using 64-bit cycles and the bus controller 168 accepts data during the write-back operation as previously explained for a write-back to a 64-bit slave, with reference to blocks 252-266 of the flow chart in FIG. 5. Again, during each bus cycle, the bus controller 168 knows to accept 64-bits of data during each bus cycle because it determined (in decision block 276) that the snooping cache is a 64-bit device.

During all read cycles, the slaves enable all bytes (8 or 16 in the present embodiment) onto the data bus. If the read was a byte read, the requesting master selects the appropriate bytes as needed from the system bus.

As described above, the present invention provides a method and apparatus for expanding the bus width of a passive backplane without the use of additional byte control lines on the bus.

Although the preferred embodiment of the present invention has been described and illustrated above, those skilled in the art will appreciate that various changes and modifications can be made to the present invention without departing from its spirit. Accordingly, the scope of the present invention is limited only by the scope of the following appended claims.

What is claimed is:

1. An expanded multiprocessor interconnection architecture having a common backplane bus, said expanded architecture being derived from a first architecture having a first data bus bit-width and a number of byte select control lines, said common backplane bus of said expanded architecture having an expanded data bus bit-width greater than said first data bus bit-width of said first architecture, and having the same number of byte select control lines as said first architecture, said backplane bus of said expanded architecture configured to operate with master and slave devices designed to utilize said expanded data bus bit-width of said expanded architecture, said backplane bus of said expanded architecture further configured to also operate with master and slave devices which are designed to utilize said first architecture without modification to the master and slave devices which are designed to utilize said first architecture, said expanded architecture comprising:

a master request line coupled to master and slave devices designed to utilize the expanded bit-width of the expanded architecture, said master request line activated only by a master device designed to utilize the expanded architecture to indicate that the master device is attempting to initiate a transfer utilizing the expanded data bus bit-width; and a slave acknowledge response line coupled to master and slave devices designed to utilize the expanded data bus bit-width, said slave acknowledge response line activated only by a slave device designed to utilize the expanded data bus bit-width in response to an active signal n said master request line, said slave acknowledge line activated to indicate that the slave device is designed to utilize the entire bit-width of the expanded backplane architecture, and wherein the bit-width for each data transfer from said master device to a slave device conforming to either said first architecture or said expanded architecture is controlled in accordance with the signal provided on said slave acknowledge response line so that said expanded architecture does not require more byte select control lines than said first architecture.

2. The expanded multiprocessor interconnection architecture of claim 1, wherein said expanded architecture further comprises at least one master device designed for use with said expanded architecture.

3. The expanded multiprocessor interconnection architecture of claim 2, wherein said expanded architecture further comprises at least one slave device designed for use with said expanded architecture.

4. The expanded multiprocessor interconnection architecture of claim 2, wherein said expanded architecture further comprises at least one slave device designed for use with said first architecture.

5. The expanded multiprocessor interconnection architecture of claim 1, wherein said expanded architecture further comprises at least one master device designed for use with said first architecture.

6. The expanded multiprocessor interconnection architecture of claim 5, wherein said expanded architecture further comprises at least one slave device designed for use with said first architecture.

7. A method of expanding a data bus width of a first multiprocessor interconnection architecture having a number of data lines comprising a first bit-width and a backplane bus with a plurality of byte select lines sufficient to indicate which bytes on the data bus are active during a bus transaction cycle to create a second expanded multiprocessor interconnection architecture with an expanded bit-width and with the same plurality of byte select control lines, said method comprising the steps of:

increasing the number of data lines of said first multiprocessor interconnection architecture to provide a second number of data lines in said second expanded multiprocessor interconnection architecture;

providing a master request interconnection line between master and slave devices designed to utilize the expanded bit-width of the second expanded architecture, said master request line carrying a master request signal activated only by a master device designed to utilize the entire bit-width of the second expanded architecture, said master request signal indicating that the master device is attempting to initiate a transfer utilizing the entire bit-width of the second expanded architecture;

providing a slave response interconnection line between master and slave devices designed to utilize the expanded bit-width of the second expanded architecture, said slave response line carrying a slave response signal activated only by a slave device designed to utilize the entire bit-width of the second expanded architecture in response to an active master request signal on said master request line, said slave response signal indicating that the slave device is designed to utilize the bit-width of the second expanded architecture; and selectively controlling the bit-width of data transferred by said master to a slave device conforming to either said first architecture or said expanded architecture in accordance with said slave response signal such that said expanded architecture does not require more byte select control lines than said first architecture.

8. A method of expanding a data bus width of a first multiprocessor interconnection architecture having a backplane data bus comprising a number of data lines with a plurality of byte select lines sufficient to indicate which bytes on the data bus are active during a bus transaction cycle, wherein expanding the backplane bus creates a second expanded multiprocessor interconnection architecture with the same plurality of byte select control lines, said method comprising the steps of:

increasing said number of data lines of said first multiprocessor interconnection architecture to provide a second number of data lines in said second expanded multiprocessor interconnection architecture;

providing a master request interconnection line between master and slave devices designed to utilize the second expanded architecture, said master request line carrying a master request signal activated only by a master device designed to utilize the second expanded architecture, said master request signal indicating that the master device is attempting to initiate a transfer utilizing the second expanded architecture;

providing a slave response interconnection line between master and slave devices designed to utilize the second expanded architecture, said slave response line carrying a slave response signal activated only by a slave device designed to utilize the second expanded architecture in response to an active master request signal on said master request line, said slave response signal indicating that the sleeve device is designed to utilize the second expanded architecture; and selectively controlling the bit-width of data transferred by said master to a slave device conforming to either said first architecture or said expanded architecture in accordance with said slave response signal such that said expanded architecture does not require more byte select control lines than said first architecture.

9. An expanded multiprocessor interconnection architecture derived from a first multiprocessor interconnection architecture, both of said architectures for use in connecting master and slave devices together, said first architecture having a first common backplane bus, said first common backplane bus including a first data bus comprising a first set of data lines and a number of byte select lines sufficient to indicate which bytes on said first data bus are active during a bus transaction cycle, said expanded architecture comprising:

an expanded common backplane bus having a second data bus comprising said first set of data lines and comprising additional data lines, said expanded backplane bus having the same said number of byte select lines as said first backplane bus;

means for allowing a master device designed to utilize the expanded architecture to send a master request signal to a slave device designed to utilize the expanded architecture, said master request signal indicating that the master device is attempting to initiate a transfer utilizing the expanded bit-width of the expanded architecture; and means for allowing a slave device designed to utilize the expanded architecture to send a slave response signal to a master device designed to utilize the expanded architecture to send a slave response signal to a master device designed to utilize the expanded architecture in response to said master request signal, said slave response signal indicating that the slave device is designed to utilize the expanded bit-width of the expanded architecture, and wherein the bit-width of data transferred from said master device conforming to said expanded architecture to a slave device conforming to either said first architecture or said expanded architecture is controlled in accordance with said master request signal and said slave response signal so that said expanded architecture does not require more byte select control lines than said first architecture to control the bit-width of data transferred in said expanded architecture.

10. An expanded multiprocessor interconnection architecture derived from a first multiprocessor interconnection architecture, both of said architectures for use in connecting master and slave devices together, said first architecture having a first common backplane bus, with a first data bus and a first set of data lines, said first backplane bus having a number of byte select lines sufficient to indicate which bytes on said first data bus are active during a bus transaction cycle, said expanded architecture comprising:

an expanded common backplane bus with a second data bus comprising said first set of data lines and comprising additional data lines, said expanded backplane bus having the same said number of byte select lines as said first backplane bus;

means for allowing a master device designed to utilize the expanded architecture to send a master request signal to a slave device designed to utilize the expanded architecture, said master request signal indicating that the master device is attempting to initiate a transfer utilizing all of the data lines of said second data bus; and means for allowing a slave device designed to utilize the expanded architecture to send a slave response signal to a master device designed to utilize the expanded architecture in response to said master request signal, said slave response signal indicating that the slave device is designed to utilize all of the data lines of said second data bus, and wherein the bit-width of data transferred from said master device to a slave device conforming to said first architecture or said expanded architecture is controlled in accordance with said master request signal and said slave response signal so that said expanded architecture requires the same number of byte select control lines as said first architecture.

* * * * *

UNITED STATES PATENT AND TRADEMARK OFFICE
CERTIFICATE OF CORRECTION

PATENT NO. : 5,301,281

DATED : April 5, 1994

INVENTOR(S) : Barry Kennedy

It is certified that error appears in the above-indentified patent and that said Letters Patent is hereby corrected as shown below:

```
In Column 6, at line 12, replace "CPU" with --CPU3--.
In Column 8, at line 16, replace "Write" with --write--.
In Column 12, at line 13, replace "signal n" with --signal on--.
In Column 14, at lines 16-18, delete the first occurrence of "to send
     a slave response signal to a master device designed to utilize
     the expanded architecture".
```

Signed and Sealed this

Twenty-fourth Day of December, 1996

Attest:

BRUCE LEHMAN

*Attesting Officer*    *Commissioner of Patents and Trademarks*